United States Patent Office 3,354,207
Patented Nov. 21, 1967

3,354,207
METHOD OF PREPARING OXAMIDE
John A. Patterson, Fishkill, N.Y., assignor to Texaco Inc., New York, N.Y., a corporation of Delaware
No Drawing. Filed Apr. 13, 1964, Ser. No. 359,409
3 Claims. (Cl. 260—561)

This invention pertains to an improved process for the preparation of oxamide. More particularly, it relates to a catalytic method of reacting cyanogen with water to form oxamide.

Oxamide is a standard chemical and finds particular use as a fertilizer compound due to its high nitrogen content.

One method of catalytic hydrolysis is reported in U.S. Patent No. 1,194,354 to Buckner. Buckner discloses a process of hydrolyzing cyanogen to oxamide utilizing aqueous hydrochloric acid and further discloses that sulfuric acid and nitric acid have little or no effect on the hydrolysis. A later improvement in the catalytic process of Buckner is found in U.S. 3,037,055 to Fierce et al. Fierce et al. describe a method of increasing the yield of the catalytic hydrolysis of Buckner for an equivalent amount of hydrochloric acid by utilizing a hydrochloric acid-glacial acetic (or acetic anhydride) catalytic mixture. Although the Fierce et al. improvement renders the Buckner process more economical it still requires the use of relatively costly glacial acetic acid or acetic anhydride.

I have discovered, and this constitutes my invention, a catalytic method of converting cyanogen by hydrolysis to oxamide in yields comparable to the best yields found in the prior art, utilizing a catalyst which is substantially less expensive than found in the prior art. Further, one of the alternative catalytic ingredients in my method has fertilizing properties, and therefore, its removal from the final oxamide reaction product is not required, thereby even further reducing costs.

Specifically, I have discovered that oxamide can be produced in high yields by reacting cyanogen with water in the presence of a catalytic mixture consisting of hydrochloric acid and a member selected from the group consisting of phosphoric acid, sulfuric acid and mixtures thereof. Under preferred conditions the reactant (mole) ratio of cyanogen to water should be between about 1:10 and 1:90. The catalytic mixture normally constitutes between about 20 and 40 wt. percent of the reaction mixture with the hydrochloric acid forming between about 65 and 90 wt. percent of the catalyst mixture. The reaction is desirably conducted at a temperature between about 10 and 100° C. and more preferably at a temperature between about 15 and 30° C. Although atmospheric pressures are employed, superatmospheric pressure, e.g. up to 1000 p.s.i.g., can be utilized. Under preferred conditions the concentrated form of the catalytic acids are employed. Further, the aforedescribed quantities relating to the acid catalyst are based on the anhydrous acids, the water of the acid being considered a part of the hydrolyzing agent.

The oxamide product can be recovered from the reaction mixture by standard means, e.g. filtration, and purified by washing with a suitable material such as water, ethanol or methanol. When phosphoric acid is employed in the catalyst system, it need not be removed from the oxamide if the product is to be used as a fertilizer since the acid will also function as a fertilizer.

The following example further illustrates the invention but it is not to be taken as a limitation thereof.

Example I

To a 500 cc. flask containing a mixture of 40.2 grams water, 185.1 grams hydrochloric acid (37 wt. percent) and 29 grams phosphoric acid (80 wt. percent) there was added 7.2 grams of cyanogen at 21–27° C. over a period of 5 hours. At the end of this time the formed oxamide crystals were separated from the reaction mixture by filtration, dried in a vacuum desiccator over calcium chloride and weighed. The dried oxamide product contained 31.1% nitrogen (theory, 31.8%) and weighed 11.3 grams, representing a yield of 93.4 mole percent based on the cyanogen charge. The foregoing reaction was repeated utilizing various quantities and catalytic combinations. The test run data are reported below in Table I. The "Weight Ratio" columns in Table I represent the weight ratio of the various reaction ingredients to cyanogen with the cyanogen quantity treated as unity. Further, the acid quantities are based on anhydrous acid.

TABLE I.—WEIGHT RATIO

| Run No. | HCl/ $(CN)_2$ | $H_2O$/ $(CN)_2$ | $CH_3COOH$/ $(CN)_2$ | $H_3PO_4$/ $(CN)_2$ | $H_2SO_4$/ $(CN)_2$ | Oxamide Yield, Mole Percent |
|---|---|---|---|---|---|---|
| A | 11.3 | 25.9 | | 3.75 | | 100 |
| B | 9.53 | 22.5 | | 3.22 | | 93.4 |
| C | 7.15 | 17.2 | | | 3.9 | 87.5 |
| D | | 15.7 | | 19.5 | | 0 |
| E | | 15 | 2.38 | 3.85 | | 0 |
| F | | 16.2 | 2.64 | 4.03 | 4.03 | 0 |
| G | 10.4 | 18.6 | | | | 83.2 |
| H | 4.74 | 10.8 | | | | 39.8 |
| I | 3.25 | 8.75 | | | | 36.7 |
| J | 8.2 | 18 | 4.98 | | | 94.1 |
| K | 6.14 | 14 | 3.72 | | | 90.1 |

As can be seen from the above, high yields are obtained utilizing the catalyst combinations of the invention (Runs A, B and C) and these yields are comparable to the yields obtained when using the prior art hydrochloric acid-acetic catalyst (Runs J and K). Further, as can be seen from Runs D, E and F, when phosphoric or sulfuric acid is the sole catalyst or used in combination with acetic acid, no oxamide product is produced. This demonstrates the unexpectedness of the synergistic like action of phosphoric or sulfuric acid when in combination with hydrochloric acid. A comparison of Runs A, B and C with Runs G, H and I further shows the effectiveness of using sulfuric or phosphoric acid in combination with hydrochloric acid.

Hereinbefore and hereinafter the term "acid," unless otherwises tated, applies to the anhydrous as well as the aqueous acid. However, the aqueous portion of the acid is considered part of the water reactant.

I claim:
1. A method of preparing oxamide consisting essentially of contacting cyanogen with water in a mole ratio of cyanogen to water of between about 1:10 and 1:90 in the presence of a catalytic mixture consisting essentially of hydrochloric acid and a member selected from the group consisting of sulfuric, phosphoric acid and mixtures thereof at a temperature between about 10 and 100° C., said catalytic mixture containing between about 65 and 90 wt. percent hydrochloric acid, the remainder being said member, and said catalytic mixture comprising between about 20 and 40 wt. percent of the total reaction mixture.

2. A method in accordance with claim 1 wherein said member is sulfuric acid.

3. A method in accordance with claim 1 wherein said member is phosphoric acid.

References Cited

UNITED STATES PATENTS

| 2,646,448 | 7/1953 | Joffe et al. | 260—561 |
| 3,037,055 | 5/1962 | Fierce et al. | 260—561 |

OTHER REFERENCES

Travagli, Chemical Abstracts, vol. 31, pp. 3873–74 (1937).

ALEX MAZEL, *Primary Examiner.*

J. A. NARCAVAGE, *Assistant Examiner.*